US010654474B2

(12) United States Patent
Jeon

(10) Patent No.: US 10,654,474 B2
(45) Date of Patent: May 19, 2020

(54) VEHICLE CONTROL APPARATUS AND VEHICLE CONTROL METHOD

(71) Applicant: MANDO CORPORATION, Gyeonggi-do (KR)

(72) Inventor: Seo Yeon Jeon, Seoul (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/245,002

(22) Filed: Jan. 10, 2019

(65) Prior Publication Data

US 2019/0210596 A1    Jul. 11, 2019

(30) Foreign Application Priority Data

Jan. 10, 2018  (KR) .......................... 10-2018-0003144

(51) Int. Cl.
*B60W 30/00* (2006.01)
*B60W 30/09* (2012.01)
(Continued)

(52) U.S. Cl.
CPC ............. *B60W 30/09* (2013.01); *B60Q 9/008* (2013.01); *B60W 50/085* (2013.01);
(Continued)

(58) Field of Classification Search
CPC .................................................. B60W 50/14
See application file for complete search history.

(56) References Cited

U.S. PATENT DOCUMENTS 9,487,139 B1 * 11/2016 Ishida ................... B60W 50/14
10,252,726 B2 * 4/2019 Emura ................... B60K 37/06
(Continued)

FOREIGN PATENT DOCUMENTS

JP    2004-164315 A    6/2004
JP    2004-352176 A    12/2004
(Continued)

OTHER PUBLICATIONS

Korean Office Action dated Nov. 8, 2018 issued in Korean Patent Application No. 10-2018-0003144.
(Continued)

*Primary Examiner* — Truc M Do
(74) *Attorney, Agent, or Firm* — Morgan, Lewis & Bockius LLP

(57) ABSTRACT

A vehicle control apparatus and a vehicle control method are disclosed. The vehicle control apparatus includes an inputter, a setting module, a determiner, and a controller. The inputter receives at least one collision avoidance operation signal from a collision avoidance device, and receives information about a current object detected by a sensing device. The setting module establishes a collision sensitive region for each driver upon receiving an ON mode signal from among the collision avoidance operation signals. The determiner determines whether the received current object information is present in a range of the established collision sensitive region for each driver. If the current object information is present in the range of the established collision sensitive region for each driver, the controller controls the collision avoidance device to perform a collision avoidance operation at a target time point earlier than a predetermined reference time point.

8 Claims, 12 Drawing Sheets

(51) Int. Cl.
  *B60W 50/08* (2020.01)
  *B60W 50/14* (2020.01)
  *B60Q 9/00* (2006.01)

(52) U.S. Cl.
  CPC ....... *B60W 50/14* (2013.01); *B60W 2050/146* (2013.01); *B60W 2540/04* (2013.01); *B60W 2540/22* (2013.01); *B60W 2540/30* (2013.01); *B60W 2710/18* (2013.01)

(56) References Cited

U.S. PATENT DOCUMENTS

| | | | |
|---|---|---|---|
| 10,354,148 B2* | 7/2019 | Ohara | |
| 2007/0046449 A1* | 3/2007 | Koike | B60Q 9/008 340/435 |
| 2009/0009603 A1* | 1/2009 | Kim | B60R 1/00 348/148 |
| 2010/0007480 A1* | 1/2010 | Uozumi | A61B 5/18 340/436 |
| 2010/0253597 A1* | 10/2010 | Seder | B60R 1/00 345/7 |
| 2013/0054086 A1* | 2/2013 | Lo | B60R 1/00 701/36 |
| 2015/0258996 A1* | 9/2015 | Victor | G09B 19/16 340/576 |
| 2017/0072949 A1* | 3/2017 | Vollmer | B60W 30/09 |
| 2017/0101056 A1* | 4/2017 | Park | B60Q 9/008 |

FOREIGN PATENT DOCUMENTS

| | | |
|---|---|---|
| JP | 2008-090683 A | 4/2008 |
| JP | 2012-014257 A | 1/2012 |
| JP | 2016-153011 A | 8/2016 |
| JP | 2017-114256 A | 6/2017 |

OTHER PUBLICATIONS

Korean Notice of Patent Allowance dated Feb. 27, 2019 issued in Korean Patent Application No. 10-2018-0003144 (with English translation).

Korean Office Action dated Nov. 8, 2018 issued in Korean Patent Application No. 10-2018-0003144 (partial English translation).

\* cited by examiner

VEHICLE CONTROL APPARATUS AND VEHICLE CONTROL METHOD

CROSS-REFERENCE TO RELATED APPLICATION

This application is based on and claims priority under 35 U.S.C. § 119 to Korean Patent Application No. 10-2018-0003144, filed on Jan. 10, 2018 in the Korean Intellectual Property Office, the disclosure of which is incorporated by reference in its entirety.

BACKGROUND

1. Field

Embodiments of the present disclosure relate to a vehicle control apparatus and a vehicle control method.

2. Description of the Related Art

Generally, a conventional collision avoidance apparatus has been designed to detect the presence or absence of a current object (i.e., an oncoming object) and to prevent or avoid collision with the detected object.

For example, Korean Patent Laid-Open Publication No. 10-2017-0060931 (2017.06.02) has disclosed an autonomous emergency braking (AEB) system and a method for controlling the same, which monitor a state of a driver who keeps eyes forward in a current lane of a vehicle using a driver state monitoring camera. If the monitored result indicates a high possibility of collision between the vehicle and a peripheral object, the autonomous emergency braking (AEB) system warns the driver about a dangerous situation having a high possibility of collision between a vehicle and a peripheral object, and thus performs autonomous emergency braking.

However, the conventional AEB system and method have difficulty in efficiently preventing (or avoiding) collision between the vehicle and the current object (i.e., oncoming object), such that it is difficult to efficiently prevent traffic accidents in advance using the conventional AEB system and method.

Therefore, many developers and companies are conducting intensive research into an enhanced vehicle control apparatus and method capable of efficiently preventing traffic accidents in advance.

In addition, an advanced vehicle control device and method capable of increasing braking efficiency and driving efficiency of a vehicle according to personal preferences of each driver have recently been proposed and intensively researched throughout the world.

CITED REFERENCE

Patent Document

Korean Patent Laid-Open Publication No. 2017-0060931 (2017.06.02)

SUMMARY

Therefore, it is an aspect of the present disclosure to provide a vehicle control apparatus for efficiently preventing traffic accidents in advance, and a method for controlling the same.

It is another aspect of the present disclosure to provide a vehicle control apparatus for improving braking efficiency and driving efficiency according to personal preferences of each driver of a vehicle, and a method for controlling the same.

Additional aspects of the disclosure will be set forth in part in the description which follows and, in part, will be obvious from the description, or may be learned by practice of the disclosure.

In accordance with an aspect of the present disclosure, a vehicle control apparatus includes an inputter, a setting module, a determiner, and a controller. The inputter receives at least one collision avoidance operation signal from a collision avoidance device, and receives information about a current object detected by a sensing device. The setting module establishes a collision sensitive region for each driver upon receiving an ON mode signal from among the collision avoidance operation signals. The determiner determines whether the received current object information is present in a range of the established collision sensitive region for each driver. If the current object information is present in the range of the established collision sensitive region for each driver, the controller controls the collision avoidance device to perform a collision avoidance operation at a target time point earlier than a predetermined reference time point.

The setting module may allow the driver to establish the collision sensitive region for each driver according to driver's health condition and driving habits.

The inputter may further receive physical information of a current driver detected by the sensing device. The setting module may automatically determine a collision sensitive region corresponding to collision risk to be the collision sensitive region for each driver according to driver's health conditions based on the received physical information.

The inputter may further receive driving habit information of a current driver detected by the sensing device. The setting module may automatically determine a collision sensitive region corresponding to collision risk to be the collision sensitive region for each driver according to driver's driving habits based on the received driving habit information.

The inputter may further receive physical information of a current driver detected by the sensing device. The setting module may automatically display a collision sensitive region corresponding to collision risk as the collision sensitive region for each driver according to driver's physical conditions based on the received physical information, and may allow the driver to select the displayed collision sensitive region corresponding to collision risk.

The inputter may further receive information about driving habits of a current driver detected by the sensing device. The setting module may automatically display a collision sensitive region corresponding to collision risk as the collision sensitive region for each driver according to driver's driving habits based on the received driving habit information, and may allow the driver to select the displayed collision sensitive region corresponding to collision risk.

The inputter may further receive a signal for executing a collision avoidance mode from among the collision avoidance operation signals from the collision avoidance device, upon receiving the current object information. The vehicle control apparatus may further include a selector, upon receiving a signal for executing a collision avoidance mode from among the collision avoidance operation signals, configured to display a collision-sensitive-region ON mode or a collision-sensitive-region OFF mode so as to determine activation or non-activation of the established collision sensitive region for each driver, and configure to select any one of the displayed collision-sensitive-region ON mode and a collision-sensitive-region OFF mode.

The collision avoidance operation includes at least one of a warning operation or a braking operation.

The controller may control the collision avoidance device to perform the collision avoidance operation at the predetermined reference time point if the collision-sensitive-region OFF mode is selected.

The controller may control the collision avoidance device to perform the collision avoidance operation at the predetermined reference time point if the current object information is present out of the range of the established collision sensitive region for each driver.

In accordance with another aspect of the present disclosure, a vehicle control method includes receiving at least one of collision avoidance operation signals from a collision avoidance device, establishing a collision sensitive region for each driver upon receiving an ON mode signal from among the collision avoidance operation signals, receiving information about a current object detected by a sensing device, determining whether the received current object information is present in a range of the established collision sensitive region for each driver, and if the current object information is present in the range of the established collision sensitive region for each driver, controlling the collision avoidance device to perform a collision avoidance operation at a target time point earlier than a predetermined reference time point.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
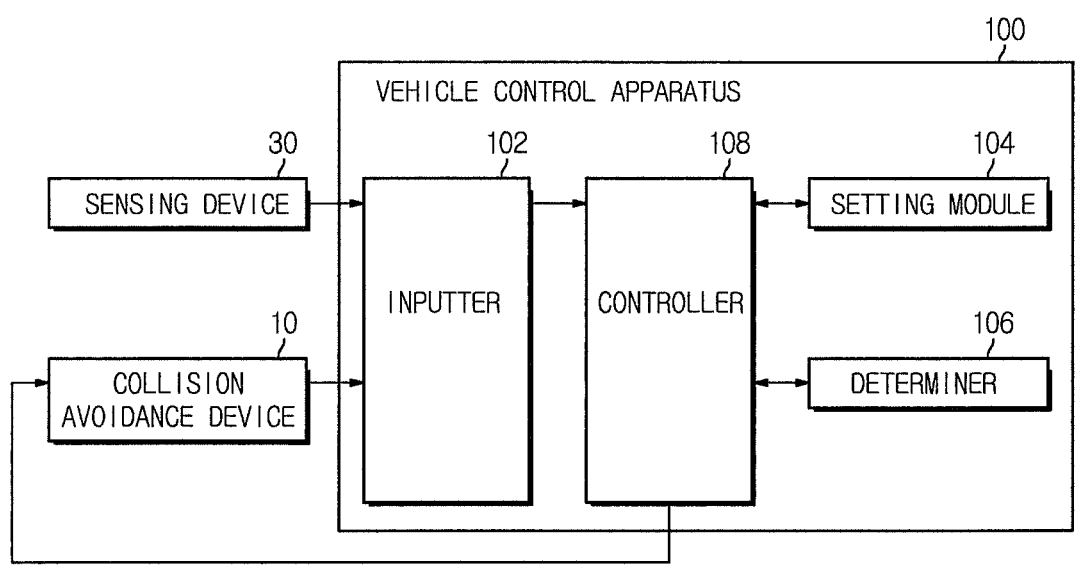
FIG. 1 is a block diagram illustrating a vehicle control apparatus according to an embodiment of the present disclosure.

Reference will now be made in detail to the embodiments of the present disclosure, examples of which are illustrated in the accompanying drawings, wherein like reference numerals refer to like elements throughout. The scope or spirit of the present disclosure is not limited to the embodiments and may be realized in various other forms. The embodiments are only provided to more completely illustrate the present disclosure and to enable a person having ordinary skill in the art to fully understand the scope of the present disclosure. In the drawings, sizes and shapes of elements may be exaggerated or reduced for convenience and clarity of description.

Figure 2:
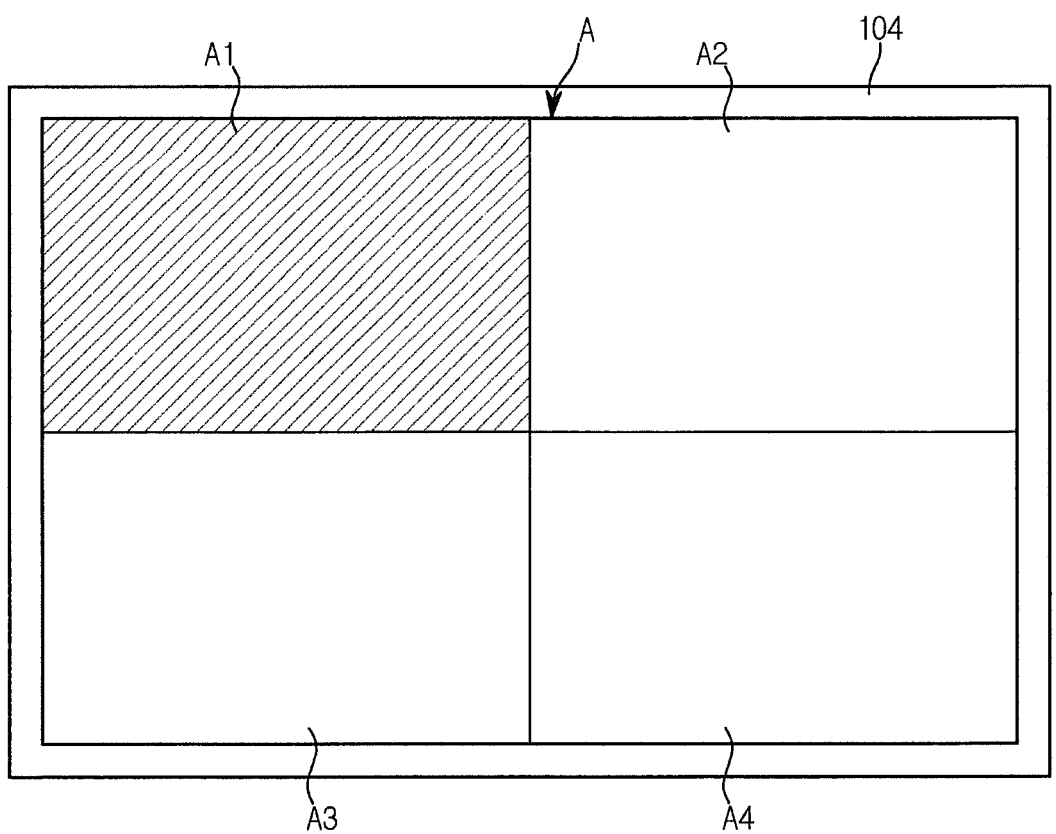
FIG. 2 is a view illustrating an exemplary status in which a collision sensitive region for each driver is established by a setting module shown in FIG. 1.

FIG. 1 is a block diagram illustrating a vehicle control apparatus according to an embodiment of the present disclosure. FIG. 2 is a view illustrating an exemplary status in which a collision sensitive region for each driver is established by a setting module shown in FIG. 1.

Figure 3:
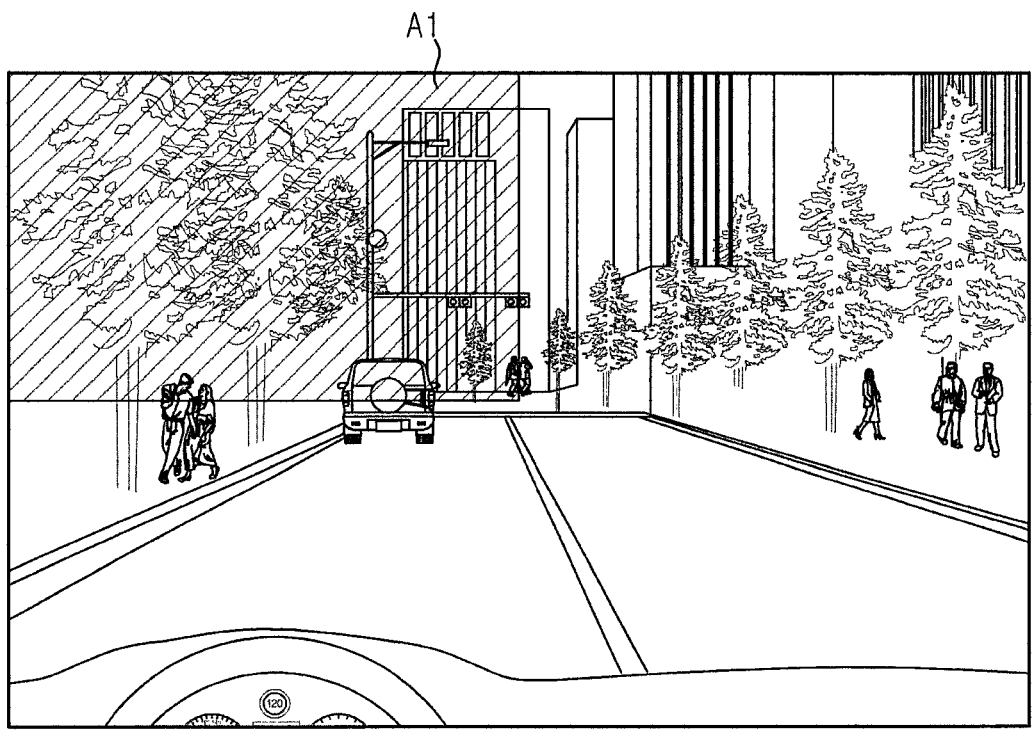
FIG. 3 is a view illustrating an exemplary status in which a collision sensitive region corresponding to collision risk shown in FIG. 2 is established.

FIG. 3 is a view illustrating an exemplary status in which a collision sensitive region corresponding to collision risk shown in FIG. 2 is established.

Referring to FIGS. 1 to 3, a vehicle control apparatus 100 may include an inputter 102, a setting module 104, a determiner 106, and a controller 108.

The inputter 102 may receive a collision avoidance operation signal from a collision avoidance device 10, and may receive information about a current object detected by a sensing device 30.

Although not shown in the drawings, the collision avoidance device 10 may be at least one of an Autonomous Emergency Braking (AEB) device (not shown) and a Forward Collision Avoidance Assist (FCAA) device (not shown).

In this case, although the sensing device 30 is not shown in the drawings, the sensing device 30 may include at least one of various constituent elements to detect information about a current object. For example, the sensing device 30 may include at least one of a CMOS image sensor (not shown), a CCD image sensor, an ultrasonic sensor (not shown), a radar sensor (not shown), an infrared (IR) sensor, a Light Detection And Ranging (LiDAR) sensor (not shown), a two-dimensional (2D) camera (not shown), a three-dimensional (3D) camera (not shown), and a 3D stereo camera (not shown).

Although the current object information is not shown, the current object may be at least one of a peripheral vehicle, a motorcycle (not shown), a bicycle (not shown), an electric bicycle (e-bike) (not shown), an electric board (not shown), an electric kickboard (not shown), an electric hoverboard (not shown), an electric wheel (not shown), a person and animal (not shown), and an obstacle (not shown).

Upon receiving an ON signal from among collision avoidance operation signals from the inputter 102, the setting module 104 may establish a collision sensitive region A (A1 to A4) for each driver.

In this case, the collision sensitive region A for each driver may be divided into four square regions A1, A2, A3, and A4. Although not shown in the drawings, the collision sensitive region A for each driver may also be divided into a predetermined number of circular, elliptical, or polygonal regions (not shown).

For example, the setting module 104 may allow the driver to establish the collision sensitive region A (A1 to A4) for each driver according to the driver's health condition and driving habits.

For example, when a field of view (FOV) loss or FOV damage occurs in some parts of a left-view region gazed at by the driver, the setting module 104 may allow the driver to establish the corresponding collision sensitive region A1 located at a left upper end of the collision sensitive region A (A1 to A4) for each driver.

In another example, the inputter 102 may further receive physical information (i.e., body status information) of a current driver detected by the sensing device 30.

In this case, upon receiving a control signal from the controller 108, the setting module 104 may automatically determine a collision sensitive region corresponding to collision risk to be a collision sensitive region A (A1 to A4) for each driver according to a health condition of each driver based on physical information applied to the inputter 102.

For example, when physical information applied to the inputter 102 indicates the presence of a field of view (FOV) loss or FOV damage in some parts of the left-view region gazed at by the driver, the setting module 104 may automatically select a left upper collision sensitive region A1 from among the collision sensitive regions A (A1 to A4) according to a control signal of the controller 108.

Although not shown in the drawings, the sensing device 30 may further include a body detection sensor (not shown) to detect physical information of a current driver.

In another example, the inputter 102 may further receive driving habit information of the current driver detected by the sensing device 30.

In this case, upon receiving a control signal from the controller 108, the setting module 104 may automatically determine a collision sensitive region corresponding to collision risk to be a collision sensitive region A (A1 to A4) for each driver according to driving habit information for each driver based on the driving habit information applied to the inputter 102.

For example, when the number of collision risks incurred in a current driving state is higher than a reference number of collision risks during a predetermined period of time on the condition that driving habit information applied to the inputter 102 indicates a left-biased driving habit of the driver, the setting module 104 may automatically select the left upper collision sensitive region A1 from among four collision sensitive regions A1 to A4 according to a control signal of the controller 108.

Although not shown in the drawings, the sensing device 30 may include at least one of a steering sensor (not shown) and a yaw rate sensor (not shown) needed to detect driving habit information of the current driver.

In another example, the inputter 102 may further receive physical information of the current driver detected by the sensing device 30 as necessary.

In this case, upon receiving a control signal from the controller 108, the setting module 104 may automatically display a collision sensitive region corresponding to collision risk, which has been composed of four collision sensitive regions A1 to A4 for each driver, according to a health condition of each driver based on physical information applied to the inputter 102, such that the driver can manually select a single collision sensitive region A1 from among the four collision sensitive regions A1 to A4.

For example, when physical information applied to the inputter 102 indicates the presence of a field of view (FOV) loss or FOV damage in some parts of the left-view region gazed at by the driver, the setting module 104 may automatically display the left upper collision sensitive region A1 selected from among the collision sensitive regions A (A1 to A4) according to a control signal of the controller 108, such that the driver can manually select the displayed collision sensitive region A1 corresponding to collision risk.

Although not shown in the drawings, the sensing device 30 may further include a body detection sensor (not shown) to detect physical information of the current driver.

In another example, the inputter 102 may further receive driving habit information of the current driver detected by the sensing device 30 as necessary.

In this case, upon receiving a control signal from the controller 108, the setting module 104 may automatically display a collision sensitive region corresponding to collision risk, which has been composed of four collision sensitive regions A1 to A4 for each driver, according to driving habits of each driver based on the driving habit information applied to the inputter 102, such that the driver can manually select a single collision sensitive region A1 from among the four collision sensitive regions A1 to A4.

For example, when the number of collision risks incurred in a current driving state is higher than a reference number of collision risks during a predetermined period of time on the condition that driving habit information applied to the inputter 102 indicates a left-biased driving habit of the driver, the setting module 104 may automatically display the left upper collision sensitive region A1 from among four collision sensitive regions A1 to A4 according to a control signal of the controller 108, such that the driver can manually select the corresponding collision sensitive region A1 corresponding to collision risk.

Although not shown in the drawings, the sensing device 30 may include at least one of a steering sensor (not shown) and a yaw rate sensor (not shown) needed to detect driving habit information of the current driver.

Upon receiving a control signal from the controller 108, the determiner 106 may determine whether current object information applied to the inputter 102 is present in the range of the established collision sensitive regions A (A1 to A4) for each driver.

The controller 108 may receive a collision avoidance operation signal from the inputter 102, and may receive current object information from the sensing device 30.

The controller 108 may transmit a setting command to the setting module 104, and may transmit a decision command to the determiner 106.

In this case, when the determiner 106 determines that the current object information is present in the range of the per-driver collision sensitive regions A (A1 to A4) established in the determiner 106, the controller 108 may control the collision avoidance operation of the collision avoidance device 10 to be activated at a target time point earlier than a reference time point.

If the determiner 106 determines that the object information exists outside the range of the per-driver collision sensitive regions (A: A1 to A4) established in the determiner 106, the controller 108 may control the collision avoidance operation of the collision avoidance device 10 to be activated at a reference time point.

In this case, the collision avoidance operation may include at least one of a warning operation and a braking operation.

Figure 4:
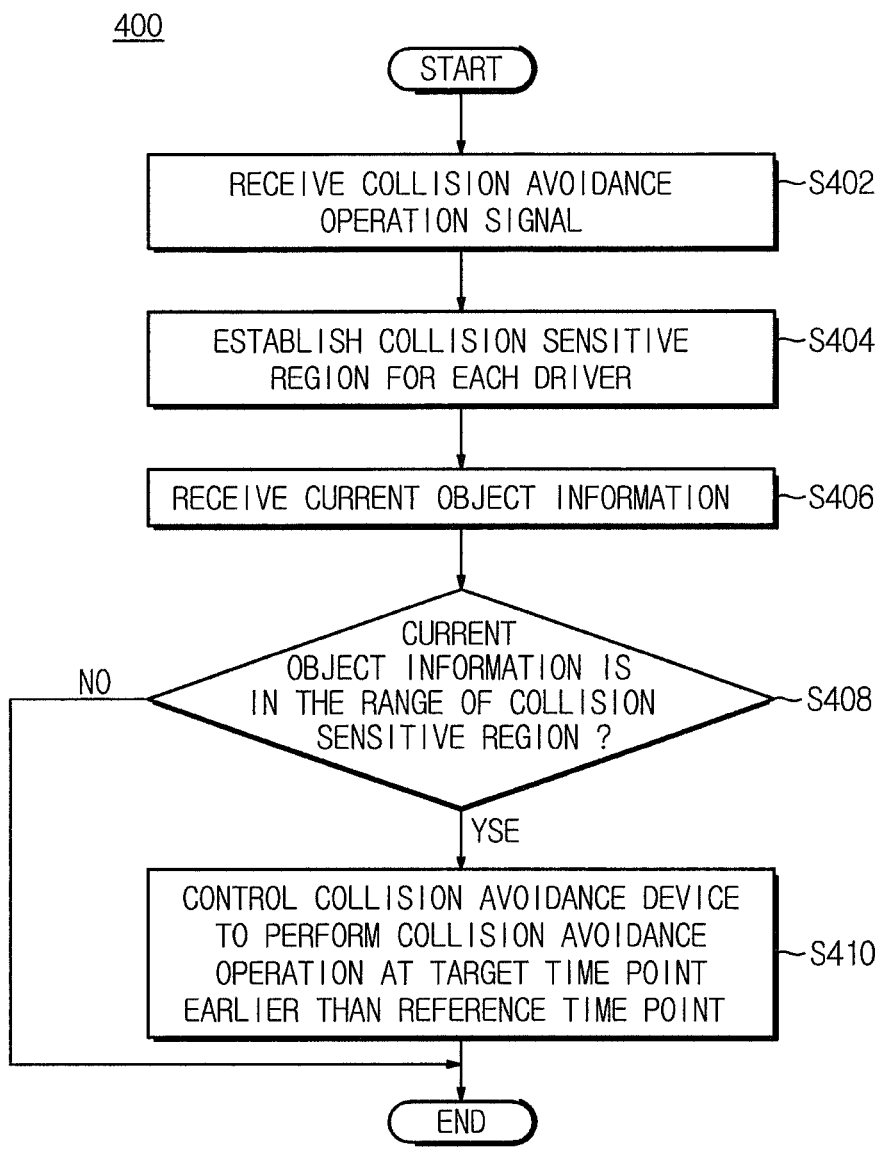
FIG. 4 is a flowchart illustrating a method for controlling a vehicle using the vehicle control apparatus according to an embodiment of the present disclosure.
Figure 5:
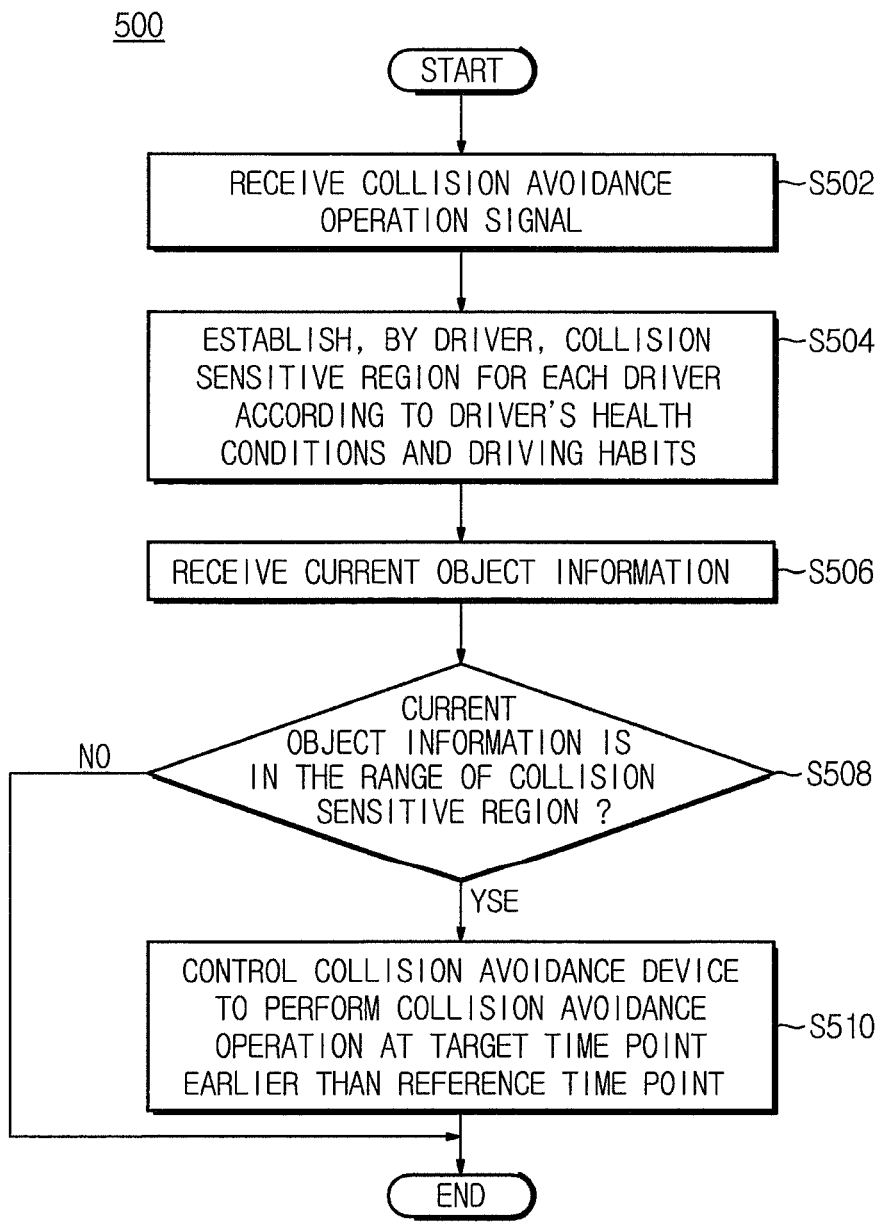
FIG. 5 is a flowchart illustrating a method for controlling a vehicle using the vehicle control apparatus according to another embodiment of the present disclosure.

FIG. 4 is a flowchart illustrating a method for controlling a vehicle using the vehicle control apparatus according to an embodiment of the present disclosure. FIG. 5 is a flowchart illustrating a method for controlling a vehicle using the vehicle control apparatus according to another embodiment of the present disclosure.

Figure 6:
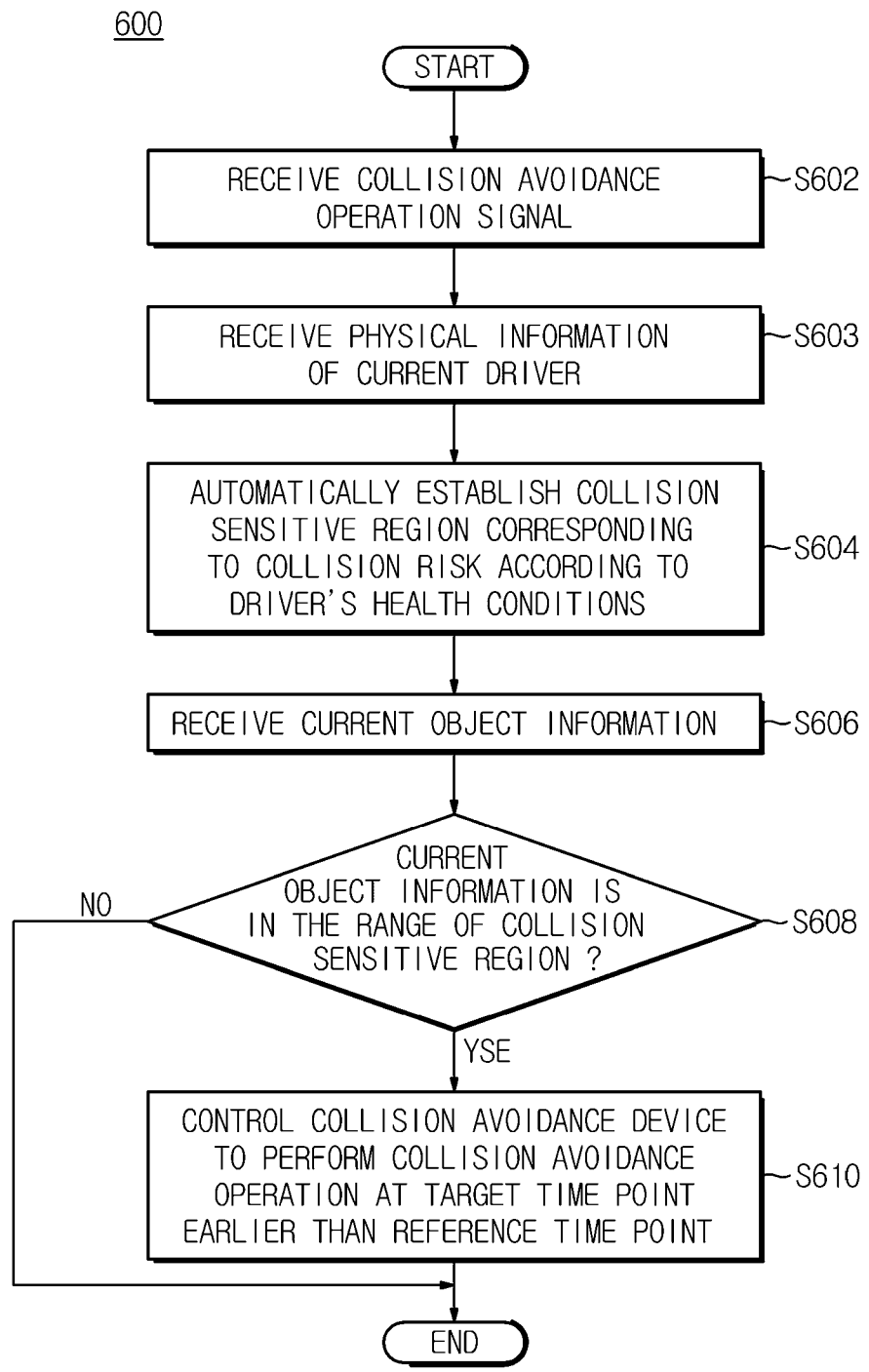
FIG. 6 is a flowchart illustrating a method for controlling a vehicle using the vehicle control apparatus according to another embodiment of the present disclosure.
Figure 7:
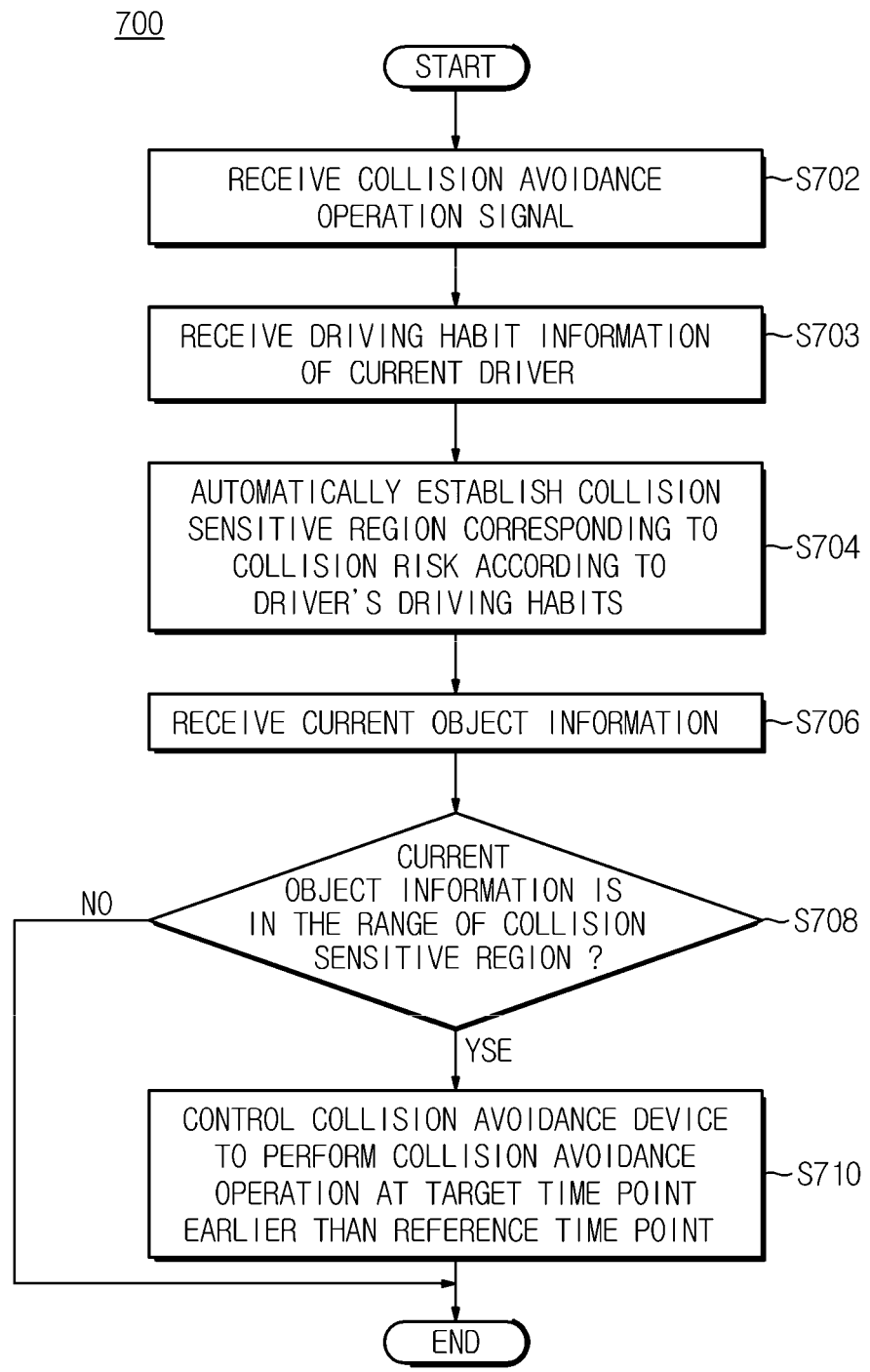
FIG. 7 is a flowchart illustrating a method for controlling a vehicle using the vehicle control apparatus according to another embodiment of the present disclosure.

FIG. 6 is a flowchart illustrating a method for controlling a vehicle using the vehicle control apparatus according to another embodiment of the present disclosure. FIG. 7 is a flowchart illustrating a method for controlling a vehicle using the vehicle control apparatus according to another embodiment of the present disclosure.

Figure 8:
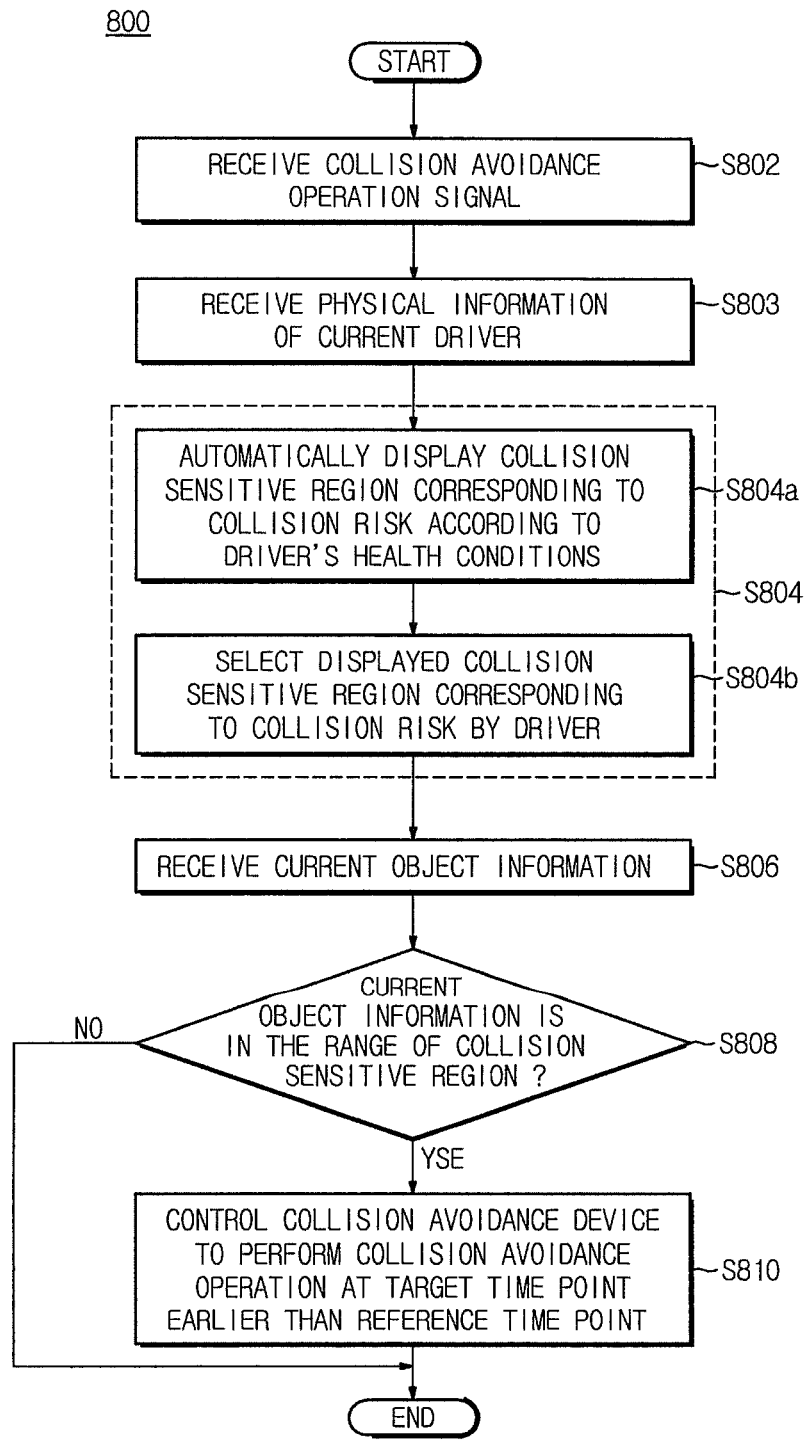
FIG. 8 is a flowchart illustrating a method for controlling a vehicle using the vehicle control apparatus according to another embodiment of the present disclosure.
Figure 9:
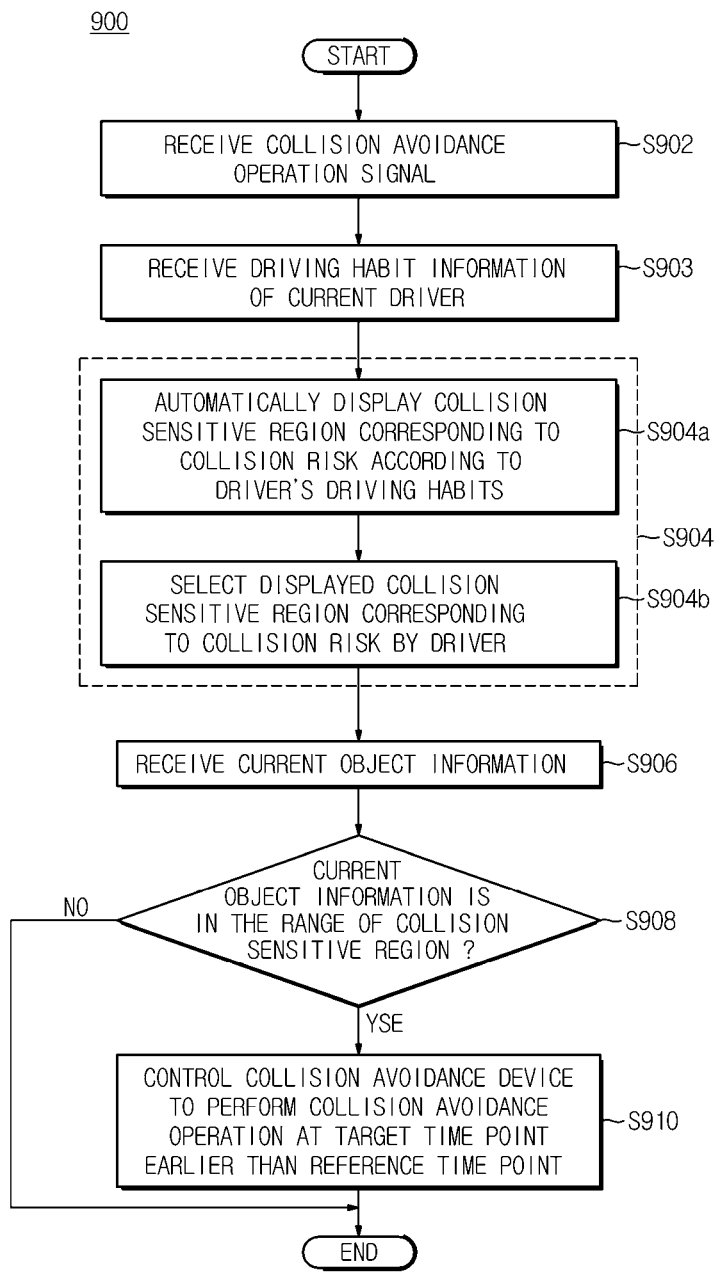
FIG. 9 is a flowchart illustrating a method for controlling a vehicle using the vehicle control apparatus according to another embodiment of the present disclosure.

FIG. 8 is a flowchart illustrating a method for controlling a vehicle using the vehicle control apparatus according to another embodiment of the present disclosure. FIG. 9 is a flowchart illustrating a method for controlling a vehicle using the vehicle control apparatus according to another embodiment of the present disclosure.

Referring to FIGS. 4 to 9, vehicle control methods 400 to 900 for use in the vehicle control apparatus 100 (see FIG. 1) according to one embodiment of the present disclosure may include first input operations S402 to S902, setting operations S404 to S904, third input operations S406 to S906, first decision operations S408 to S908, and control operations S410 to S910.

The vehicle control methods 600 to 900 for use in the vehicle control apparatus 100 (see FIG. 1) according to one embodiment may further include second input operations S603 to S903.

In the first input operations S402 to S902, the vehicle control apparatus 100 may receive a collision avoidance operation signal from the collision avoidance device 10 (see FIG. 1) from the inputter 102 (see FIG. 1).

In the setting operation S404, upon receiving a collision-avoidance-operation ON signal from the inputter 102 (see FIG. 1), the vehicle control apparatus 100 may establish the collision sensitive region A (A1 to A4) for each driver using the setting module 104 (see FIG. 1).

For example, as shown in FIG. 5, in the setting operation S504, the driver who uses the setting module 104 (see FIG. 1) may manually set the collision sensitive region A (A1 to A4 in FIG. 2) for each driver according to a health condition and driving habits of the driver.

In another example, as shown in FIG. 6, in the second input operation S603, the vehicle control apparatus 100 may further receive physical information of the current driver detected by the sensing device 30 (see FIG. 1) from the inputter 102 (see FIG. 1) as necessary.

Thereafter, in the setting operation S604, upon receiving a control signal from the controller 108 (see FIG. 1), the setting module 104 (see FIG. 1) may automatically set a collision sensitive region corresponding to collision risk to the collision sensitive regions A (A1 to A4 in FIG. 2) for each driver according to a health condition of the driver based on the physical information applied to the inputter 102 (see FIG. 1).

In another example, as shown in FIG. 7, in the second input operation S703, the inputter 102 (see FIG. 2) may further receive driving habit information of the current driver detected by the sensing device 30 (see FIG. 1) as necessary.

Thereafter, in the setting operation S704, upon receiving a control signal from the controller 108 (see FIG. 1), the setting module 104 (see FIG. 1) may automatically set a collision sensitive region corresponding to collision risk to the collision sensitive regions A (A1 to A4 in FIG. 2) for each driver according to driving habits of each driver based on the driving habit information applied to the inputter 102 (FIG. 1).

In another example, as shown in FIG. 8, in the second input operation S803, the inputter 102 (see FIG. 1) may further receive physical information of the current driver detected by the sensing device 30 (see FIG. 1) as necessary.

Thereafter, in the setting operation S804, upon receiving a control signal from the controller 108 (see FIG. 1), the setting module 104 (see FIG. 1) may automatically display a collision sensitive region corresponding to collision risk, which has been composed of four collision sensitive regions A1 to A4 (A) for each driver, according to a health condition of each driver based on physical information applied to the inputter 102 (see FIG. 1), such that the driver can manually select a single collision sensitive region A1 (see FIG. 2) from among the four collision sensitive regions A1 to A4.

In another example, as shown in FIG. 9, in the second input operation S903, the inputter 102 (see FIG. 1) may further receive driving habit information of the current driver detected by the sensing device 30 (see FIG. 1) as necessary.

Thereafter, in the setting operation S904, upon receiving a control signal from the controller 108 (see FIG. 1), the setting module 104 (see FIG. 1) may automatically display a collision sensitive region corresponding to collision risk, which has been composed of four collision sensitive regions A1 to A4 (A) for each driver, according to driving habits of each driver based on the driving habit information applied to the inputter 102 (see FIG. 1), such that the driver can manually select a collision sensitive region A1 (see FIG. 2) corresponding to the displayed collision risk.

In the third input operations S406 to S906, the vehicle control apparatus 100 may receive current object information detected by the sensing device 30 (see FIG. 1) through the inputter 102 (see FIG. 1).

In the decision operations S408 to S908, upon receiving a control signal from the controller 108 (see FIG. 1), the determiner 106 (see FIG. 1) may determine whether current object information applied to the inputter 102 (see FIG. 1) is present in the range of the established collision sensitive regions A (A1 to A4 in FIG. 2) for each driver.

If the controller 108 determines that the object information exists outside the range of the per-driver collision sensitive regions, the controller 108 may control the collision avoidance operation of the collision avoidance device 10 to be activated at a reference time point.

In the control operations S410 to S910, when the determiner 106 (see FIG. 1) determines the presence of current object information in the range of the collision sensitive regions A1 to A4 (A) (see FIG. 2) established in the determiner 106, the controller 108 (see FIG. 1) may control the collision avoidance operation of the collision avoidance device 10 (see FIG. 1) to be activated at a target time point earlier than a reference time point established in the controller 108 (see FIG. 1).

Figure 10:
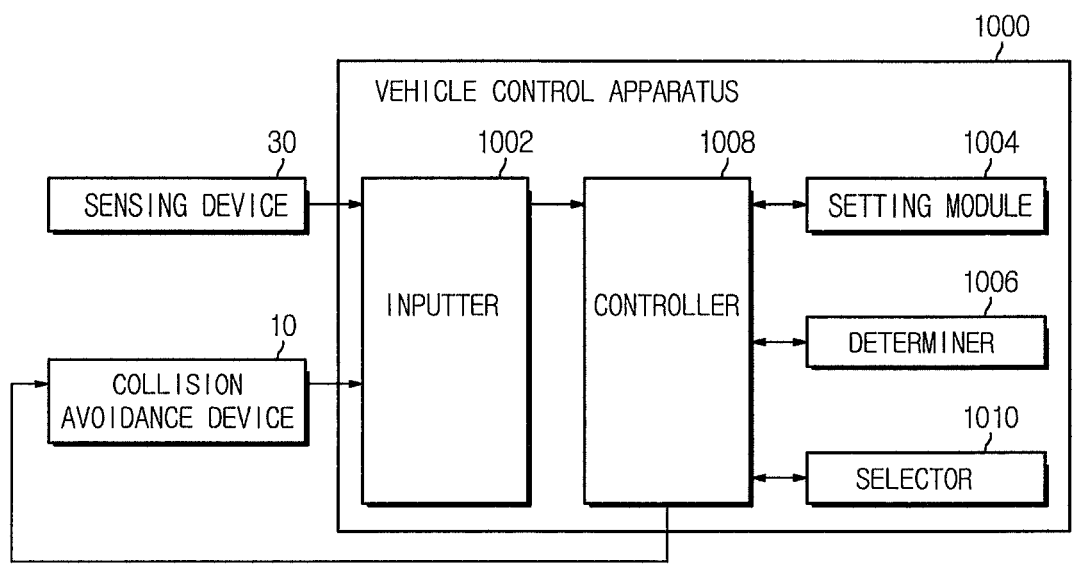
FIG. 10 is a block diagram illustrating a vehicle control apparatus according to another embodiment of the present disclosure.
Figure 11:
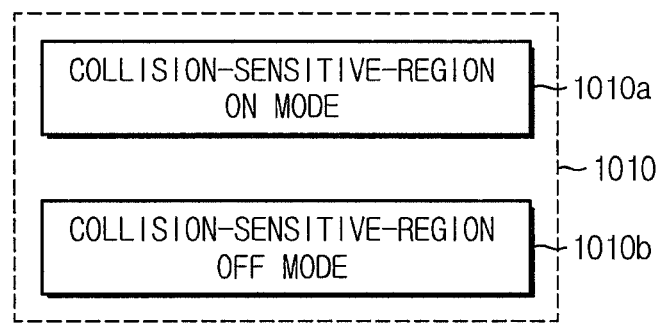
FIG. 11 is a conceptual diagram illustrating an exemplary status in which a collision-sensitive-region ON mode and a collision-sensitive-region OFF mode are selected by a selector shown in FIG. 10.

FIG. 10 is a block diagram illustrating a vehicle control apparatus according to another embodiment of the present disclosure. FIG. 11 is a conceptual diagram illustrating an exemplary status in which a collision-sensitive-region ON mode and a collision-sensitive-region OFF mode are selected by a selector shown in FIG. 10.

Referring to FIGS. 10 and 11, the vehicle control apparatus 1000 may include an inputter 1002, a setting module 1004, a determiner 1006, and a controller 1008 in the same manner as in the vehicle control apparatus 100 of FIG. 1.

Functions of constituent elements of the vehicle control apparatus 1000 and the connection relationship therebetween are identical to those of constituent elements of the vehicle control apparatus 100 (see FIG. 1), and as such a detailed description thereof will herein be omitted for convenience of description.

If the inputter 1002 of the vehicle control apparatus 1000 receives current object information, the inputter 1002 may further receive a signal for executing the collision avoidance mode from among collision avoidance operation signals from the collision avoidance device 10.

In this case, when the selector 1010 of the vehicle control apparatus 1000 receives the signal for executing the collision avoidance mode from among collision avoidance operation signals applied to the inputter 1002 upon receiving a control signal from the controller 1008, the vehicle control apparatus 1000 may display the collision-sensitive-region ON mode 1010a or the collision-sensitive-region OFF mode 1010b in a manner that the driver can decide whether to activate the collision sensitive regions A1 to A4 (A) (see FIG. 2) for each driver established in the setting module 1004, such that the driver can select any one of the displayed collision-sensitive-region ON mode 1010a and the displayed collision-sensitive-region OFF mode 1010b.

If the controller operates in the collision-sensitive-region OFF mode 1010b, the controller 108 may control the collision avoidance operation of the collision avoidance device 10 to be activated at a reference time point.

Although not shown in the drawings, the selector 1010 may select the collision-sensitive-region ON mode 1010a or the collision-sensitive-region OFF mode 1010b displayed on a display (not shown) through a touch action activated by the driver's finger or through a user-input action activated by the driver who manipulates an input device (not shown).

In this case, although not shown in the drawings, the display device (not shown) may include at least one of an Organic Light Emitting Diode (OLED) module (not shown), a Liquid Crystal Display (LCD) module (not shown), a Quantum dot Light Emitting Diode (QLED) module (not shown), a Human Machine Interface (HMI) module, and a Head Up Display (HUD) module (not shown). Although not shown in the drawings, the input device (not shown) may include at least one of a mouse (not shown), a digital pen (not shown), and a voice recognition device (not shown).

Figure 12:
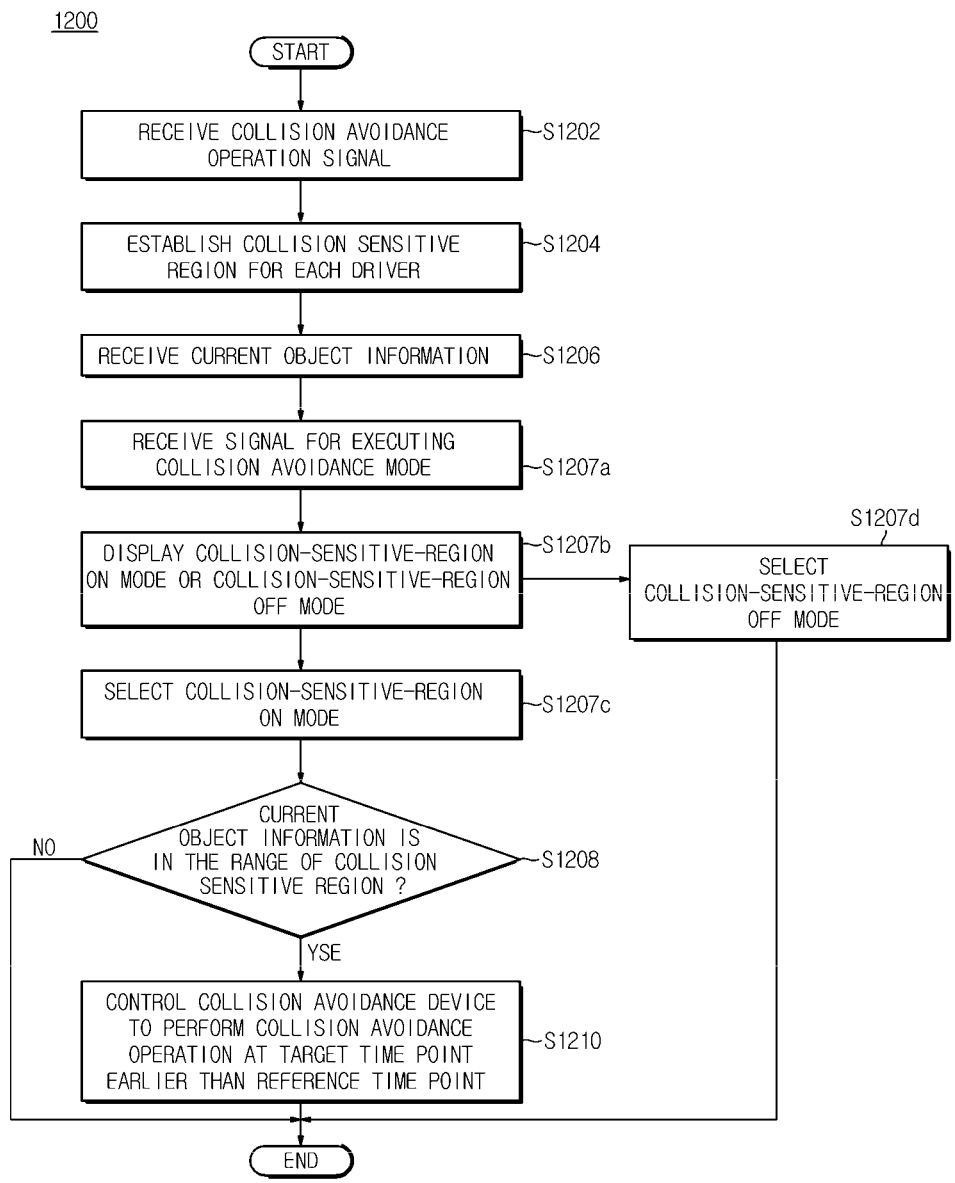
FIG. 12 is a flowchart illustrating a method for controlling a vehicle using the vehicle control apparatus according to still another embodiment of the present disclosure.

FIG. 12 is a flowchart illustrating a method for controlling a vehicle using the vehicle control apparatus according to still another embodiment of the present disclosure.

Referring to FIG. 12, a vehicle control method 1200 for use in the vehicle control apparatus 1000 (see FIG. 10) may include a first input operation S1202, a setting operation S1204, a third input operation S1206, a first decision operation S1208, and a control operation S1210 in the same manner as in the vehicle control method 400 of the vehicle control apparatus 100 (see FIG. 1).

If the controller 108 determines that the object information exists outside the range of the per-driver collision sensitive regions, the controller 108 may control the collision avoidance operation of the collision avoidance device 10 to be activated at a reference time point.

Functions of individual operations of the vehicle control method 1200 of the vehicle control apparatus 1000 (see FIG. 10) and the connection relationship therebetween are identical to those of the individual operations of the vehicle control method 400 (see FIG. 4) of the vehicle control apparatus 100 (see FIG. 1), and as such a detailed description thereof will herein be omitted for convenience of description.

The vehicle control method 1200 for use in the vehicle control apparatus 1000 (see FIG. 10) may further include a fourth input operation S1207a and selection operations S1207b, S1207c, and S1207d.

For example, the fourth input operation S1207a and the selection operations S1207b, S1207c, and S1207d may be carried out before the third input operation S1206 or before the first decision operation S1208.

That is, in the fourth input operation S1207a, when the inputter 1002 (see FIG. 10) receives current object information, the inputter 1002 (see FIG. 10) vehicle may receive a signal for executing the collision avoidance mode from among the collision avoidance operation signals from the collision avoidance device 10 (see FIG. 10) upon receiving a control signal from the controller 1008 (see FIG. 10).

Thereafter, in the selection operation S1207a, when the selector 1010 (see FIG. 10) receives the signal for executing the collision avoidance mode from among the collision avoidance operation signals applied to the inputter 1002 (see FIG. 10) upon receiving a control signal from the controller 1008 (see FIG. 10), the vehicle control apparatus 1000 may display the collision-sensitive-region ON mode 1010a (see FIG. 11) or the collision-sensitive-region OFF mode 1010b such that the driver can determine whether to activate the per-driver collision sensitive regions A1 to A4 (A) (see FIG. 2) established in the setting module 1004 (see FIG. 10).

Thereafter, in the selection operations S1207c and S1207d, the driver may manually select any one of the displayed collision-sensitive-region ON mode 1010a (see FIG. 11) and the displayed collision-sensitive-region OFF mode 1010b.

Meanwhile, although the vehicle control apparatuses 100 and 1000 according to the embodiments of the present disclosure have disclosed that the inputters 102 and 1002, the determiners 106 and 1006, and the controllers 108 and 1008 are separated from one another to clearly explain characteristics of the present disclosure, each of the inputters 102 and 1002, each of the determiners 106 and 1006, and each of the controllers 108 and 1008 may be respectively implemented as Electronic Control Units (ECUs) or Micro Control Units (MCUs) configured to control overall operation of the vehicle as well as to perform input and judgment functions.

However, the scope of the inputters 102 and 1002, the determiners 106 and 1006, and the controllers 108 and 1008 is not limited thereto, and it should be noted that all control means capable of controlling overall operation of the vehicle, all input means capable of performing the input function, and all judgment means capable of performing the judgment function may also be easily applied to the present disclosure without departing from the scope and spirit of the present disclosure.

Although not shown in the drawings, the setting modules 104 and 1004 for use in the vehicle control apparatuses 100 and 1000 may establish the per-driver collision sensitive regions A1 to A4 (A) displayed on the display device (not shown) through a touch action activated by the driver's finger or through a user-input action activated by the driver who manipulates the input device (not shown).

In this case, although not shown in the drawings, the display device (not shown) may include at least one of an OLED module (not shown), an LCD module (not shown), a QLED module (not shown), a Human Machine Interface (HMI) module, and a Head Up Display (HUD) module (not shown). Although not shown in the drawings, the input device (not shown) may include at least one of a mouse (not shown), a digital pen (not shown), and a voice recognition device (not shown).

The vehicle control methods 400 to 900 and 200 for use in the vehicle control apparatuses 100 and 1000 may include the inputters 102 and 1002, the setting modules 104 and 1004, the determiners 106 and 1006, and the controllers 108 and 1008.

Therefore, the vehicle control apparatus 100 and the vehicle control methods 400 to 900 according to the embodiment of the present disclosure may establish the collision sensitive regions A1 to A4 (A) for each driver. When current object information is present in the range of the collision sensitive regions A1 to A4 (A), the vehicle control apparatus 100 and the vehicle control methods 400 to 900 may control the collision avoidance device 10 such that the collision avoidance operation of the collision avoidance device 10 can be carried out at a target time point earlier than a predetermined reference time point.

Therefore, the vehicle control apparatus 100 and the vehicle control methods 400 to 900 according to the embodiment of the present disclosure can efficiently prevent traffic accidents in advance.

In addition, the vehicle control apparatus 1000 and the vehicle control method 1200 according to the embodiment of the present disclosure may further include the selector 1010.

Therefore, the vehicle control apparatus 1000 and the vehicle control method 1200 according to the embodiment of the present disclosure may select the per-driver collision sensitive regions A1 to A4 (A) established in the setting module 1004 through the collision-sensitive-region ON mode 1010a or the collision-sensitive-region OFF mode 1010b.

Accordingly, the vehicle control apparatus 1000 and the vehicle control method 1200 according to the embodiment of the present disclosure may select any one of the collision-sensitive-region ON mode 1010a and the collision-sensitive-region OFF mode 1010b according to personal preferences of each driver, such that braking efficiency and driving efficiency can be greatly improved according to personal preferences of individual drivers.

If the controller operates in the collision-sensitive-region OFF mode 1010b, the controller 108 may control the collision avoidance operation of the collision avoidance device 10 to be activated at a reference time point.

As is apparent from the above description, the vehicle control apparatus and the vehicle control method according to the embodiments of the present disclosure may efficiently prevent traffic accidents in advance.

The vehicle control apparatus and the vehicle control method according to the embodiments of the present disclosure may improve braking efficiency and driving efficiency of a vehicle according to personal preferences of each driver of the vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle control apparatus comprising:
   an inputter configured to receive at least one of collision avoidance operation signals from a collision avoidance device, receive information about a current object detected by a sensing device, and receive a signal for executing a collision avoidance mode from among the collision avoidance operation signals from the collision avoidance device, upon receiving the current object information;
   a setting module configured to establish a collision sensitive region for each driver upon receiving an ON mode signal from among the collision avoidance operation signals;
   a determiner configured to determine whether the received current object information is present in a range of the established collision sensitive region for each driver;
   a controller configured to control the collision avoidance device to perform a collision avoidance operation; and
   a selector, upon receiving a signal for executing the collision avoidance mode from among the collision avoidance operation signals, configured to display a collision-sensitive-region ON mode or a collision-sensitive-region OFF mode so as to determine activation or non-activation of the established collision sensitive region for each driver, and select any one of the displayed collision-sensitive-region ON mode and the collision-sensitive-region OFF mode,
   wherein, if the current object information is present in the range of the established collision sensitive region for each driver, the controller controls the collision avoidance device to perform the collision avoidance operation at a target time point earlier than a predetermined reference time point.

2. The vehicle control apparatus according to claim 1, wherein the setting module allows the driver to establish the collision sensitive region for each driver according to driver's health condition and driving habits.

3. The vehicle control apparatus according to claim 1, wherein:
   the inputter further receives physical information of a current driver detected by the sensing device; and
   the setting module automatically determines a collision sensitive region corresponding to collision risk to be the collision sensitive region for each driver according to driver's health conditions based on the received physical information.

4. The vehicle control apparatus according to claim 1, wherein:
   the inputter further receives driving habit information of a current driver detected by the sensing device; and
   the setting module automatically determines a collision sensitive region corresponding to collision risk to be the collision sensitive region for each driver according to driver's driving habits based on the received driving habit information.

5. The vehicle control apparatus according to claim 1, wherein:
   the inputter further receives physical information of a current driver detected by the sensing device; and
   the setting module automatically displays a collision sensitive region corresponding to collision risk as the collision sensitive region for each driver according to driver's physical conditions based on the received physical information, and allows the driver to select the displayed collision sensitive region corresponding to collision risk.

6. The vehicle control apparatus according to claim 1, wherein:
   the inputter further receives information about driving habits of a current driver detected by the sensing device; and the setting module automatically displays a collision sensitive region corresponding to collision risk as the collision sensitive region for each driver according to driver's driving habits based on the received driving habit information, and allows the driver to select the displayed collision sensitive region corresponding to collision risk.

7. The vehicle control apparatus according to claim 1, wherein the collision avoidance operation includes at least one of a warning operation or a braking operation.

8. A vehicle control method comprising:
receiving at least one of collision avoidance operation signals from a collision avoidance device;
establishing a collision sensitive region for each driver upon receiving an ON mode signal from among the collision avoidance operation signals;
receiving information about a current object detected by a sensing device;
receiving a signal for executing a collision avoidance mode from among the collision avoidance operation signals from the collision avoidance device, upon receiving the current object information;
displaying a collision-sensitive-region ON mode or a collision-sensitive-region OFF mode so as to determine activation or non-activation of the established collision sensitive region for each driver, upon receiving a signal for executing the collision avoidance mode from among the collision avoidance operation signals;
selecting any one of the displayed collision-sensitive-region ON mode and the collision-sensitive-region OFF mode;
determining whether the received current object information is present in a range of the established collision sensitive region for each driver upon selecting the displayed collision-sensitive-region ON mode; and
if the current object information is present in the range of the established collision sensitive region for each driver, controlling the collision avoidance device to perform a collision avoidance operation at a target time point earlier than a predetermined reference time point.

* * * * *